(12) United States Patent
Zhang et al.

(10) Patent No.: US 12,446,094 B2
(45) Date of Patent: Oct. 14, 2025

(54) METHOD PERFORMED BY USER EQUIPMENT, AND USER EQUIPMENT

(71) Applicant: Sharp Kabushiki Kaisha, Sakai (JP)

(72) Inventors: Chongming Zhang, Shanghai (CN); Renmao Liu, Shanghai (CN); Fangying Xiao, Shanghai (CN); Ningjuan Chang, Shanghai (CN)

(73) Assignee: SHARP KABUSHIKI KAISHA, Sakai (JP)

( * ) Notice: Subject to any disclaimer, the term of this patent is extended or adjusted under 35 U.S.C. 154(b) by 432 days.

(21) Appl. No.: 17/919,314

(22) PCT Filed: Apr. 2, 2021

(86) PCT No.: PCT/CN2021/085172
§ 371 (c)(1),
(2) Date: Oct. 17, 2022

(87) PCT Pub. No.: WO2021/213175
PCT Pub. Date: Oct. 28, 2021

(65) Prior Publication Data
US 2023/0171838 A1 Jun. 1, 2023

(30) Foreign Application Priority Data
Apr. 21, 2020 (CN) .......................... 202010319644.2

(51) Int. Cl.
*H04W 76/20* (2018.01)
*H04W 24/10* (2009.01)
*H04W 76/27* (2018.01)

(52) U.S. Cl.
CPC ........... *H04W 76/20* (2018.02); *H04W 24/10* (2013.01); *H04W 76/27* (2018.02)

(58) Field of Classification Search
CPC ..... H04W 76/20; H04W 24/10; H04W 76/27; H04W 88/02; H04W 52/0216;
(Continued)

(56) References Cited

U.S. PATENT DOCUMENTS

| 2016/0044744 | A1* | 2/2016 | Lee | ........................ | H04W 16/32 |
| | | | | | 370/329 |
| 2022/0167445 | A1* | 5/2022 | Wang | ..................... | H04L 1/0025 |

FOREIGN PATENT DOCUMENTS

CN 106538034 A 3/2017

OTHER PUBLICATIONS

Official Communication issued in International Patent Application No. PCT/CN2021/085172, mailed on Jul. 5, 2021.
(Continued)

*Primary Examiner* — Shawn D Miller
(74) *Attorney, Agent, or Firm* — Keating & Bennett, LLP

(57) ABSTRACT

Provided in the present invention are a method performed by user equipment, and user equipment. The method performed by user equipment is a method for deactivating an SCG in a process in which UE configured with dual connectivity or multi-connectivity communicates with an MCG and the SCG. The MCG is a serving cell group controlled by an MN, and the SCG is a serving cell group controlled by an SN. The method includes the following steps: receiving, by the UE, an SCG deactivation command, and when the UE receives the SCG deactivation command, performing at least one of the following operations: suspending/pausing transmission of an SRB and a DRB on the SCG; stopping a timer T310, wherein T310 is started when the UE consecutively receives N out-of-sync indications on a PSCell of the SCG; stopping a timer T312, wherein T312 is configured with a timer measurement ID, and is started when a measurement report thereof is triggered; suspending/pausing a measurement
(Continued)

If an SCG is deactivated, and if UE needs to perform SCG measurement result reporting, then UE performs the SCG measurement result reporting → S201 configuration associated with the SCG; releasing the measurement configuration associated with the SCG; deactivating an SCell of the SCG; deactivating the PSCell of the SCG; and starting an SCG deactivation timer.

2 Claims, 1 Drawing Sheet

(58) Field of Classification Search
CPC ......... H04W 52/0229; H04W 52/0235; H04W 52/0248; H04W 52/028; H04W 36/0069; H04W 76/15; H04W 36/0085; H04W 24/02; H04W 24/08; Y02D 30/70
See application file for complete search history.

(56) References Cited

OTHER PUBLICATIONS

Ericsson et al., "New WID on DC and CA enhancements (NR_DCCA_Enh)", 3GPP TSG-RAN#80, RP-181469, Jun. 11-14, 2018, 5 pages.
Ericsson, "Independent handling of SCG resume/suspend", 3GPP TSG-RAN WG2 #107, R2-1910266, Aug. 26-30, 2019, 3 pages.
Vivo, "UE behaviour for a suspended SCG", 3GPP TSG-RAN WG2 Meeting #108, R2-1914944, Nov. 18-22, 2019, 5 pages.

* cited by examiner

METHOD PERFORMED BY USER EQUIPMENT, AND USER EQUIPMENT

TECHNICAL FIELD

The present invention relates to the technical field of wireless communications. More specifically, the present invention relates to a method performed by user equipment, and corresponding user equipment.

BACKGROUND

With the rapid growth of mobile communications and great progress of technology, the world will move toward a fully interconnected network society where anyone or anything can acquire information and share data anytime and anywhere. For the requirements on enhanced mobile broadband services and communication requirements on massive Internet of Things terminals, new-generation communication techniques (5G) will carry out researches on the technical enhancement for users in dual connectivity and multi-connectivity (RP-181469 New WID on DC and CA enhancements).

Dual connectivity or multi-connectivity means that UE operating in a connected state establishes a physically established wireless connection with more than one network node, and implements data transmission. A master node (MN) and a secondary node (SN) are included. The MN is executed by one Gnb/Enb/ng-eNB. A serving cell group controlled by the MN is referred to as a master cell group (MCG). Correspondingly, the SN is executed by one or more Gnbs/Enbs/ng-eNBs. A serving cell group controlled by the SN is referred to as a secondary cell group (SCG).

UE configured with dual connectivity or multi-connectivity may achieve a high data rate by communicating with the MCG and the SCG. Correspondingly, however, in order to maintain communication with two network nodes, power consumption of the UE is also doubled. To reduce power consumption of the UE, the SCG may be deactivated in a suitable case, such as in the case where communication traffic of the UE is small. How to achieve the objective of reducing power consumption by deactivating an SCG is a problem that needs to be solved.

SUMMARY

Provided in the present invention are solutions for the following problems, that is, a solution to achieve the objective of reducing power consumption by deactivating an SCG, and also a solution to perform SCG measurement result reporting when UE is configured with a measurement configuration associated an SCG and if the SCG is deactivated.

An objective of the present invention is to provide a method performed by user equipment and capable of reducing power consumption by deactivating an SCG and performing SCG measurement result reporting when the SCG is deactivated and corresponding user equipment.

According to an aspect of the present invention, a method performed by user equipment is provided, being a method for deactivating a secondary cell group (SCG) in a process in which user equipment (UE) configured with dual connectivity or multi-connectivity communicates with a master cell group (MCG) and the SCG, the MCG being a serving cell group controlled by a master node (MN), the SCG being a serving cell group controlled by a secondary node (SN), comprising the following steps:

receiving, by the UE, an SCG deactivation command, and when the UE receives the SCG deactivation command, performing at least one of the following operations:

suspending/pausing transmission of a signaling radio bearer (SRB) and a data radio bearer (DRB) on the SCG;

stopping a timer T310, wherein T310 is started when the UE consecutively receives N out-of-sync indications on a primary serving cell (PSCell) of the SCG;

stopping a timer T312, wherein T312 is configured with a timer measurement ID, and is started when a measurement report thereof is triggered;

suspending/pausing measurement configuration associated with the SCG;

releasing the measurement configuration associated with the SCG;

deactivating a secondary serving cell (SCell) of the SCG;

deactivating the primary serving cell (PSCell) of the SCG; and starting an SCG deactivation timer.

In the above method performed by user equipment, preferably, a serving cell deactivation operation comprising the deactivating the SCell of the SCG and the deactivating the PSCell of the SCG is at least one of the following operations:

stopping a bandwidth part deactivation timer related to the serving cell;

deactivating any active bandwidth part (BWP) related to the serving cell.

In the above method performed by user equipment, preferably, when a serving cell is deactivated, no transmission of a sounding reference signal (SRS) is performed on the serving cell;

no channel state information (CSI) reporting is performed for the serving cell;

no transmission is performed on an uplink channel of the serving cell;

no transmission is performed on a random channel of the serving cell;

no monitoring of a physical downlink control channel (PDCCH) is performed on the serving cell;

no monitoring of a PDCCH related to the serving cell is performed; or no transmission of a physical uplink control channel (PUCCH) is performed on the serving cell.

In the above method performed by user equipment, preferably, the deactivating the PSCell of the SCG is performing switching on a BWP of the PSCell to switch from a currently operating or active BWP to a dormant BWP.

In the above method performed by user equipment, preferably, when the UE receives the SCG deactivation command, the UE does not monitor downlink radio link quality on the PSCell.

In the above method performed by user equipment, preferably, when the UE is configured with the measurement configuration associated with the SCG, if the SCG is deactivated, and if the UE needs to perform SCG measurement result reporting, the UE performs the SCG measurement result reporting:

when the measurement report of the UE is associated with the SCG, if the UE is configured with an SRB3, and if the SCG is in a non-deactivated state, then the UE submits a measurement report message to a lower layer via the SRB3 for transmission, wherein the SRB3 is an SRB established between the SN and the UE;

when the measurement report of the UE is associated with the SCG, if the UE is configured with an SRB3, and if the SCG is in a deactivated state at a time point of submitting/generating a measurement report message, then the UE submits the measurement report message to a lower layer via an SRB1 for transmission, wherein the SRB1 is an SRB established between the MN and the UE; and when the measurement report of the UE is associated with the SCG, if the UE is not configured with an SRB3, then the UE submits a measurement report message to a lower layer via an SRB1 for transmission.

In the above method performed by user equipment, preferably, when the UE is configured with the measurement configuration associated with the SCG, if the SCG is deactivated, and if the UE needs to perform SCG measurement result reporting, the UE performs the SCG measurement result reporting:

when the measurement report of the UE is associated with the SCG, if the UE is configured with an SRB3, and if the UE has not received any SCG deactivation command before a time point of submitting or generating a measurement report message, then the UE submits the measurement report message to a lower layer via the SRB3 for transmission, wherein the SRB3 is an SRB established between the SN and the UE;

when the measurement report of the UE is associated with the SCG, if the UE is configured with an SRB3, and if the UE has received the SCG deactivation command before a time point of submitting a measurement report message, then the UE submits the measurement report message to a lower layer via an SRB1 for transmission, wherein the SRB1 is an SRB established between the MN and the UE; and when the measurement report of the UE is associated with the SCG, if the UE is not configured with an SRB3, then the UE submits a measurement report message to a lower layer via an SRB1 for transmission.

In the above method performed by user equipment, preferably, a radio resource control (RRC) message is used, and the message includes an indication therein indicating to the UE to deactivate a currently configured SCG;

an SCG deactivation Media Access Control layer control element (MAC CE) is used, and the MAC CE includes an indication therein indicating to the UE to deactivate a currently configured SCG;

a serving cell deactivation MAC CE is used, and when deactivation of the PSCell of the SCG is indicated in the MAC CE, the UE considers that the SCG deactivation command has been received; or a downlink control information (DCI) format is used, the DCI format carries a field which or a value of which indicates deactivation of the PSCell of the SCG.

According to an aspect of the present invention, another method performed by user equipment is provided, being a method for performing measurement result reporting when an SCG is deactivated in a process in which UE configured with dual connectivity or multi-connectivity communicates with an MCG and the SCG, the MCG being a serving cell group controlled by a master node (MN), the SCG being a serving cell group controlled by a secondary node (SN), comprising the following step:

when the UE is configured with the measurement configuration associated with the SCG, if the SCG is deactivated, and if the UE needs to perform SCG measurement result reporting, performing, by the UE, the SCG measurement result reporting:

when a measurement report of the UE is associated with the SCG, if the UE is configured with an SRB3, and if the SCG is in a non-deactivated state, or if the UE has not received any SCG deactivation command before a time point of submitting or generating a measurement report message, then the UE submits the measurement report message to a lower layer via the SRB3 for transmission, wherein the SRB3 is an SRB established between the SN and the UE;

when the measurement report of the UE is associated with the SCG, if the UE is configured with an SRB3, and if the SCG is in a deactivated state at a time point of submitting/generating a measurement report message, or if the UE has received the SCG deactivation command before the time point of submitting a measurement report message, then the UE submits the measurement report message to a lower layer via an SRB1 for transmission, wherein the SRB1 is an SRB established between the MN and the UE; and when the measurement report of the UE is associated with the SCG, if the UE is not configured with an SRB3, then the UE submits a measurement report message to a lower layer via an SRB1 for transmission.

According to another aspect of the present invention, user equipment is provided, comprising:

a processor; and a memory storing instructions, wherein the instructions, when run by the processor, cause the user equipment to perform the method described above.

The method performed by user equipment and corresponding user equipment according to the present disclosure can reduce power consumption by deactivating an SCG, and can perform SCG measurement result reporting when the SCG is deactivated.

DETAILED DESCRIPTION

Figure 1:
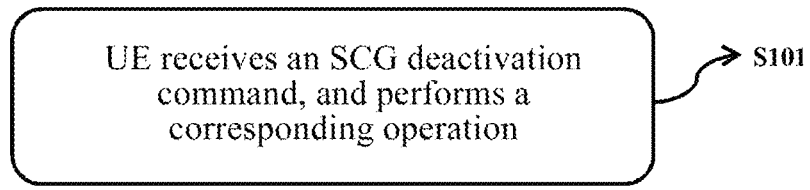
FIG. 1 is a flowchart showing a method performed by user equipment according to an embodiment of the present invention.

The following describes the present invention in detail with reference to the accompanying drawings and specific embodiments. It should be noted that the present invention should not be limited to the specific embodiments described below. In addition, detailed descriptions of well-known technologies not directly related to the present invention are omitted for the sake of brevity, in order to avoid obscuring the understanding of the present invention.

Prior to the specific description, several terms mentioned in the present invention are illustrated as follows. The terms involved in the present invention shall have the meanings set forth below, unless otherwise indicated.

UE: User Equipment

NR: New Radio eLTE enhanced Long Term Evolution
E-UTRAN: Evolved Universal Terrestrial Radio Access Network
DC: Dual Connectivity
MC: Multi Connectivity
Gnb: a base station node which provides UE with NR user plane and control plane protocol stacks and is connected to a 5G core network
Enb: a base station node which provides UE with E-UTRAN user plane and control plane protocol stacks and is connected to an EPC core network
Ng-enb: a base station node which provides UE with E-UTRAN user plane and control plane protocol stacks and is connected to a 5G core network
SRB: signaling radio bear
DRB: data radio bear
Split SRB: split signaling radio bearer
RLC: Radio Link Control layer
PDCP: Packet Data Convergence Protocol layer
MAC: Media Access Control layer
RRC: Radio Resource Control layer
SRS: Sounding Reference Signal
CSI: Channel State Information
PDCCH: Physical Downlink Control Channel
PUCCH: Physical Uplink Control Channel
DCI: Downlink Control Information Dual connectivity or multi-connectivity means that UE operating in a connected state establishes a physically established wireless connection with more than one network node, and implements data transmission. A master node (MN) and a secondary node (SN) are included.

The MN is executed by one base station, and may be a Gnb that supports 5G technology or an Enb that supports 4G technology, and may also be an ng-eNB that supports connection to a next generation core network (5G core network). A serving cell group controlled by the MN is referred to as a master cell group (MCG). At least one primary serving cell is present, and is referred to as a primary cell (PCell). UE performs radio link monitoring (RLM) on the PCell. If the MCG further includes other cells, then the other cells may be referred to collectively as a secondary serving cell (SCell). An SRB established between the MN and the UE is commonly referred to as an SRB1, and is mainly used to transmit an RRC message between the MN and the UE.

The SN is executed by one base station, and may be a Gnb that supports 5G technology or an Enb that supports 4G technology, and may also be an ng-eNB that supports connection to a next generation core network (5G core network). A serving cell group controlled by the SN is referred to as a secondary cell group (SCG). The SCG at least includes a primary serving cell referred to as a PSCell (Primary SCG Cell). The UE performs radio link monitoring on the PSCell. If the SCG further includes other cells, then the other cells may be referred to collectively as a secondary serving cell (SCell). An SRB may be established between the SN and the UE, commonly referred to as an SRB3, and is mainly used to transmit an RRC message between the SN and the UE, e.g., an SCG-associated measurement report.

Specific embodiments of the present invention are described in detail below. In addition, as described above, the embodiments of the present invention are exemplary descriptions for facilitating understanding of the present invention, and are not intended to limit the present invention.

Embodiment 1

Provided in this embodiment is a method for deactivating an SCG in a process in which UE configured with dual connectivity or multi-connectivity communicates with an MCG and the SCG. As shown in FIG. 1, the method includes:

Step S101: receiving, by the UE, an SCG deactivation command, and when the UE receives the SCG deactivation command, performing, by the UE, at least one or more of the following operations:

suspending/pausing transmission of an SRB and a DRB on the SCG, wherein preferably, transmission of all SRBs and all DRBs on the SCG may be suspended/paused;

stopping a timer T310, wherein T310 is started when the UE consecutively receives N out-of-sync indications on a PSCell;

stopping a timer T312, wherein T312 is configured with a timer measurement identity (ID), and is started when a measurement report thereof is triggered;

suspending/pausing measurement associated with the SCG, wherein the measurement herein refers to a measurement operation performed according to a measurement configuration; or suspending/pausing a measurement configuration (measConfig associated with SCG) associated with the SCG, wherein such measurement configuration may be contained in an RRCReconfiguration message received by the UE from an SRB3 or contained in an RRCReconfiguration message included in an RRCReconfiguration message received by the UE from an SRB1;

releasing the measurement configuration associated with the SCG, wherein such measurement configuration may be contained in an RRCReconfiguration message received by the UE from an SRB3 or contained in an RRCReconfiguration message included in an RRCReconfiguration message received by the UE from an SRB1;

deactivating an SCell of the SCG, wherein preferably, all SCells of the SCG may be deactivated;

deactivating the PSCell of the SCG; and starting an SCG deactivation timer, wherein a duration of the timer is preconfigured by a network side/base station, and when the timer expires or is stopped, it can be considered that the SCG is no longer in a deactivated state, or it can be considered that the SCG is activated.

Embodiment 2

The "deactivating an SCell of the SCG" and the "deactivating the PSCell of the SCG" mentioned in Embodiment 1 may both be referred to as deactivating a serving cell. Deactivating a serving cell includes at least the following operations:

stopping a bandwidth part deactivation timer bwp-InactivityTimer related to the serving cell; and deactivating any active bandwidth part (BWP) related to the serving cell.

When a serving cell is deactivated, the serving cell has at least one or more of the following features:

no transmission of an SRS is performed on the serving cell (SCell);

no CSI reporting is performed for the serving cell (SCell);

no transmission is performed on an uplink channel (UL-SCH) of the serving cell (SCell);

no transmission is performed on a random channel (RACH) of the serving cell (SCell);

no monitoring of a PDCCH is performed on the serving cell (SCell);

no monitoring of a PDCCH related to the serving cell (SCell) is performed; and no transmission of a PUCCH is performed on the serving cell (SCell).

It may be considered that a serving cell having the above features may be referred to as a deactivated cell or a cell in a deactivated state.

Embodiment 2 may be implemented on the basis that Embodiment 1 has performed the operation of deactivating the SCell or deactivating the PSCell.

Embodiment 3

Another implementation method of "deactivating the PSCell of the SCG" mentioned in Embodiment 1 may be performing switching on a BWP of the PSCell to switch from a currently operating or active BWP to a dormant BWP.

For example, on the PSCell, prior to reception of the SCG deactivation command, a BWP ID of a BWP on which the UE operates or a BWP ID of an active BWP is BWP-1. When the SCG deactivation command is received, switching from the BWP on which the UE operates or the active BWP to a BWP having a BWP ID of BWP-2 is performed. This BWP-2 is a dormant BWP.

The dormant BWP means that the BWP configuration does not contain PDCCH configurations, or does not contain valid PDCCH configurations. That is, the PDCCH configurations are absent. These PDCCH configurations are used to monitor a PDCCH, so that when a dormant BWP does not contain any PDCCH configurations, the UE does not need to monitor a corresponding PDCCH on the dormant BWP, thereby achieving the objective of power saving.

Preferably, this BWP-2 is a preconfigured default BWP, and is a dormant BWP. When the UE receives the SCG deactivation command, the UE always switches from the active BWP to the default BWP on the PSCell of the SCG.

Embodiment 3 may be implemented on the basis that Embodiment 1 has performed the operation of deactivating the PSCell.

Embodiment 4

To further reduce energy consumption, when the UE receives the SCG deactivation command, the UE may stop or suspend RLM on the PSCell. A specific implementation may be as follows:

When the UE receives the SCG deactivation command, the UE does not monitor downlink radio link quality on the PSCell. Correspondingly, when the UE receives an SCG activation command, the UE monitors downlink radio link quality on the PSCell.

When the UE receives the SCG deactivation command, the UE may also continue performing the RLM on the PSCell. However, in order to reduce energy consumption, it may be performed in the following modes.

Mode 1

When the SCG is deactivated, the UE performs RLM on a particular BWP.

This particular BWP may be an operating or active BWP on the PSCell of the SCG when the UE receives the SCG deactivation command.

This particular BWP may also be a default BWP. When the UE receives the SCG deactivation command, the UE switches to the default BWP, and performs RLM on this default BWP. In this case, this default BWP may be deactivated.

Mode 2

When the SCG is deactivated, the UE performs the RLM on the basis of a particular RLM configuration. The RLM configuration may be referred to as RLM configuration-1.

When the UE does not receive the SCG deactivation command, the UE needs to perform the RLM on the PSCell of the SCG on the basis of RLM configuration-2.

According to comparison between RLM configuration-1 and RLM configuration-2, a reference signal used for RLM contained in RLM configuration-1 may be different from a reference signal for RLM contained in RLM configuration-2. Specifically, the reference signals may have different periods. The value of the period of the reference signal for RLM contained in RLM configuration-1 may be greater than the value of the period of the reference signal for RLM contained in RLM configuration-2.

Mode 3

A method for determining an RLM indication period when the SCG is deactivated is different from a method for determining an RLM indication period when the SCG is not deactivated.

The indication period refers to a time interval at which the UE indicates in-sync or out-of-sync information to an upper layer on the basis of an RLM result. For example, if the value of the indication period is X, then the UE reports an in-sync (or out-of-sync) indication to the upper layer at a current time point according to a measurement result, and then the UE reports an in-sync (or out-of-sync) indication to the upper layer again at the next time point, which is the current time point+X, according to a measurement result. The interval between the two time points is X, i.e., the indication period.

The determining the indication period may specifically be as follows:

If the SCG is not deactivated, or no SCG deactivation command is received, then the greatest value of RLM reference signal period-1 and constant 1 (or parameter 1) may be selected as the indication period.

If the UE receives the SCG deactivation command, or the SCG is deactivated, then the greatest value of RLM reference signal period-2 and constant 2 (or parameter 2) may be selected as the indication period.

Constant 1 is less than constant 2, or the value of parameter 1 is less than that of parameter 2.

Further, mode 1 and mode 2 may be used in combination. For example, when the SCG is deactivated, the UE performs RLM on a particular BWP. On the particular BWP, the UE is configured with a particular RLM configuration, i.e., RLM configuration-1, for performing RLM when the SCG is deactivated.

Mode 2 and mode 3 may also be used in combination, and modes 1, 2, and 3 may also be used in combination.

When the UE is configured with the measurement configuration associated with the SCG, if the SCG is deactivated, then how to perform SCG measurement result reporting is a problem that needs to be solved.

Embodiment 5

Figure 2:
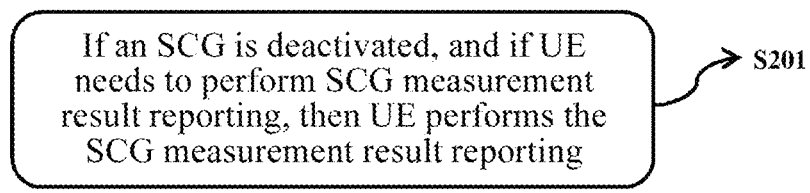
FIG. 2 is a flowchart showing a method performed by user equipment according to another embodiment of the present invention.

Provided in this embodiment is a method for performing measurement result reporting when an SCG is deactivated in a process in which UE configured with dual connectivity or multi-connectivity communicates with an MCG and the SCG. As shown in FIG. 2, the method includes:

Step S201: when the UE is configured with a measurement configuration associated with the SCG, if the SCG is deactivated, and if the UE needs to perform SCG measurement result reporting, for example, if an SCG measurement reporting operation is triggered, then the UE performs the SCG measurement result reporting. A specific reporting method is as follows:

In the case that a measurement report of the UE is associated with the SCG, if the UE is configured with an SRB3, and if the SCG is in a non-deactivated state (or is in an activated state), the UE submits a measurement report message to a lower layer via the SRB3 for transmission.

In another case that the measurement report of the UE is associated with the SCG, if the UE is configured with an SRB3, and if the SCG is in a deactivated state at a time point of submitting/generating a measurement report message, the UE submits the measurement report message to a lower layer via an SRB1 for transmission. Preferably, the measurement report is embedded in an NR RRC message ULInforamtionTransferMRDC so as to be submitted to the lower layer.

In another case that the measurement report of the UE is associated with the SCG, if the UE is not configured with an SRB3, the UE submits a measurement report message to a lower layer via an SRB1 for transmission. Preferably, the measurement report is embedded in an NR RRC message ULInforamtionTransferMRDC so as to be submitted to the lower layer.

In the above cases, "the SCG is in a non-deactivated state" may be replaced with "the UE has not received any SCG deactivation command before a time point of submitting or generating a measurement report message". In the above cases, "the SCG is in a deactivated state at a time point of submitting/generating a measurement report message" may be replaced with "the UE has received the SCG deactivation command before a time point of submitting a measurement report message". In addition, transmission of the SCG is paused/suspended when the SCG is in the deactivated state, so that in the above cases, "the SCG is in a deactivated state at a time point of submitting/generating a measurement report message" may be replaced with "transmission of the SCG (or the SRB3) is paused/suspended", and correspondingly, in the above cases, "the SCG is in a non-deactivated state" may be replaced with "transmission of the SCG (or the SRB3) is not paused/suspended".

Embodiment 5 may be implemented in conjunction with Embodiment 1, or may be implemented separately, so as to solve the problem of measurement report transmission when the SCG is deactivated.

Embodiment 6

The SCG deactivation command received by UE in Embodiments 1-5 may be implemented in the following modes.

Mode 1: Explicit Deactivation

An RRC message, preferably an RRC reconfiguration message, may be designed to include an indication therein indicating to the UE to deactivate a currently configured SCG. In particular, if the UE is configured with multiple SCGs, then the message further needs to carry a sequence number of the SCG.

On the basis of the indication, the UE performs, on the deactivated SCG, any operation in above Embodiments 1-5.

Mode 2: Explicit Deactivation

An SCG deactivation MAC CE may be designed to include an indication therein indicating to the UE to deactivate a currently configured SCG. In particular, if multiple SCGs are configured, then the MAC CE further needs to carry a sequence number of the SCG.

When the UE receives the SCG deactivation MAC CE, information indicating that the SCG is deactivated needs to be indicated to the upper layer. The upper layer herein mainly refers to the RRC layer.

The RRC layer performs, on the deactivated SCG, and on the basis of the indication, any operation in above Embodiments 1-5.

Mode 3: Implicit Deactivation

A serving cell deactivation MAC CE may be designed. When deactivation of the PSCell of the SCG is indicated in the MAC CE, the UE may consider that the SCG deactivation command has been received. The deactivation of the SCG is implicitly indicated herein by deactivation of the PSCell of the SCG.

When the UE receives the serving cell deactivation MAC CE, and when deactivation of the PSCell of the SCG is indicated in the MAC CE, information indicating that the SCG is deactivated or information indicating that the PSCell of the SCG is deactivated needs to be indicated to the upper layer. The upper layer herein mainly refers to the RRC layer.

The RRC layer performs, on the deactivated SCG, and on the basis of the indication, any operation in above Embodiments 1-5.

Mode 4: Implicit Deactivation

A DCI format may be designed to carry a field which or a value of which indicates deactivation of the PSCell of the SCG.

When the UE receives a PDCCH carrying the DCI format, it may be considered that the SCG deactivation command has been received. Reception of the PDCCH is processed on the physical layer, so that when the PDCCH is received, information indicating that the SCG is deactivated or information indicating that the PSCell of the SCG is deactivated needs to be indicated to the upper layer.

The upper layer performs, on the deactivated SCG, and on the basis of the indication, any operation in above Embodiments 1-5.

When the UE receives the message/MAC CE/DCI in any one of the above modes, it can be considered that the UE has received the SCG deactivation command, or it can be considered that the SCG is in the deactivated/inactive state.

If the UE does not receive the message/MAC CE/DCI in any one of the above modes, it can be considered that the UE has not received any SCG deactivation command, and it can be considered that the SCG is in the activated state.

Figure 3:
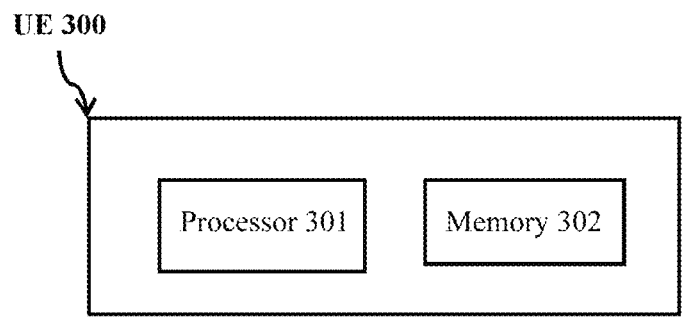
FIG. 3 is a schematic structural block diagram of user equipment according to the present invention.

FIG. 3 is a schematic structural block diagram of user equipment according to the present invention. As shown in FIG. 3, the UE 300 includes a processor 301 and a memory 302. The processor 301 may include, for example, a microprocessor, a microcontroller, an embedded processor, and the like. The memory 302 may include, for example, a volatile memory (such as a random access memory (RAM)), a hard disk drive (HDD), a non-volatile memory (such as a flash memory), or other memories. The memory 302 stores program instructions. The instructions, when run by the processor 301, can perform the above method performed by user equipment as described in detail in the present invention.

The program running on the device according to the present invention may be a program that enables the computer to implement the functions of the embodiments of the present invention by controlling a central processing unit (CPU). The program or information processed by the program may be temporarily stored in a volatile memory (for example, a random access memory (RAM)), a hard disk drive (HDD), a non-volatile memory (for example, a flash memory), or other memory systems.

The program for implementing the functions of the embodiments of the present invention may be recorded on a computer-readable recording medium. The corresponding functions may be achieved by reading programs recorded on the recording medium and executing them by the computer system. The phrase "computer system" herein may be a computer system embedded in the device, which may include operating systems or hardware (e.g., peripherals). The phrase "computer-readable recording medium" may refer to a semiconductor recording medium, an optical recording medium, a magnetic recording medium, a recording medium for programs that are dynamically stored for a short time, or any other recording medium readable by a computer.

Various features or functional modules of the device used in the above embodiments may be implemented or executed by circuits (for example, monolithic or multi-chip integrated circuits). Circuits designed to execute the functions described in this description may include general-purpose processors, digital signal processors (DSPs), application specific integrated circuits (ASICs), field programmable gate arrays (FPGAs) or other programmable logic devices, discrete gates or transistor logic, or discrete hardware components, or any combination of the above. The general-purpose processor may be a microprocessor, or may be any existing processor, controller, microcontroller, or state machine. The circuits may be digital circuits or analog circuits. When new integrated circuit technologies that replace existing integrated circuits emerge because of the advances in semiconductor technology, one or a plurality of embodiments of the present invention may also be implemented using these new integrated circuit technologies.

Furthermore, the present invention is not limited to the embodiments described above. Although various examples of the embodiments have been described, the present invention is not limited thereto. Fixed or non-mobile electronic devices installed indoors or outdoors, such as AV equipment, kitchen equipment, cleaning equipment, air conditioners, office equipment, vending machines, and other household appliances, may be used as terminal devices or communications devices.

The embodiments of the present invention have been described in detail above with reference to the accompanying drawings. However, the specific structures are not limited to the above embodiments. The present invention also includes any design modifications that do not depart from the main idea of the present invention. In addition, various modifications can be made to the present invention within the scope of the claims. Embodiments resulting from appropriate combination of the technical means disclosed in the different embodiments are also included within the technical scope of the present invention. In addition, components with the same effect described in the above embodiments may be replaced with one another.

The invention claimed is:

1. A method performed by user equipment, comprising:
   upon receiving a radio resource control (RRC) reconfiguration message which includes an indication to indicate secondary cell group (SCG) deactivation,
   stopping radio link monitoring on a primary SCG cell (PSCell) of the SCG,
   deactivating all secondary cells (SCells) of the SCG,
   determining whether a signaling radio bearer 3 (SRB3) is configured and the SCG is deactivated,
   if the SRB3 is configured, and the SCG is not deactivated, submit a measurement report message via the SRB3 to a lower layer for transmission, and
   if the SRB3 is configured, and the SCG is deactivated, submit the measurement report message via a signaling radio bearer 1 (SRB1).

2. User equipment, comprising:
   a processor; and
   a non-transitory memory in electronic communication with the processor, wherein instructions stored in the non-transitory memory are executable to:
   upon receiving a radio resource control (RRC) reconfiguration message which includes an indication to indicate secondary cell group (SCG) deactivation,
   stop radio link monitoring on a primary SCG cell (PSCell) of the SCG,
   deactivate all secondary cells (SCells) of the SCG,
   determine whether a signaling radio bearer 3 (SRB3) is configured and the SCG is deactivated,
   if the SRB3 is configured, and the SCG is not deactivated, submit a measurement report message via the SRB3 to a lower layer for transmission, and
   if the SRB3 is configured, and the SCG is deactivated, submit the measurement report message via a signaling radio bearer 1 (SRB1).

* * * * *